United States Patent
Zornow et al.

(10) Patent No.: US 11,648,616 B2
(45) Date of Patent: May 16, 2023

(54) RECIPROCATING SAW

(71) Applicant: MILWAUKEE ELECTRIC TOOL CORPORATION, Brookfield, WI (US)

(72) Inventors: Vincent Zornow, Milwaukee, WI (US); Jonathon Gasteiner, Brookfield, WI (US); Gerald Zucca, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 17/124,698

(22) Filed: Dec. 17, 2020

(65) Prior Publication Data
US 2021/0187637 A1 Jun. 24, 2021

Related U.S. Application Data

(60) Provisional application No. 62/951,193, filed on Dec. 20, 2019.

(51) Int. Cl.
*B23D 49/16* (2006.01)
(52) U.S. Cl.
CPC .................................. *B23D 49/16* (2013.01)
(58) Field of Classification Search
CPC .......... B26D 5/00; B26D 5/005; B26D 5/007; B23D 59/008; B23D 49/16; G01B 11/14; B23Q 17/22; B23Q 17/24; B27G 19/006
USPC ..... 83/58, 61, 62, 62.1, 63, 76.1, 76.7, 76.8, 83/360, 361, 364, 365, 370, 371, 372
See application file for complete search history.

(56) References Cited

U.S. PATENT DOCUMENTS

| | | | | |
|---|---|---|---|---|
| 3,515,251 A * | 6/1970 | Clapp | ................... | F16D 43/206 192/150 |
| 4,219,747 A * | 8/1980 | Hornung | ............... | B23D 59/001 310/68 B |
| 5,984,020 A * | 11/1999 | Meyer | ....................... | F16P 3/00 173/171 |
| 6,236,177 B1 * | 5/2001 | Zick | .......................... | B27B 5/38 318/362 |
| 7,533,736 B2 * | 5/2009 | Stirm | ................... | B25D 11/062 173/210 |
| 8,230,605 B2 * | 7/2012 | Oberheim | .............. | B23D 51/02 30/376 |

(Continued)

FOREIGN PATENT DOCUMENTS

DE 102012217179 A1 * 5/2013 ................ B25F 5/00
EP 3162479 A1 5/2017
(Continued)

OTHER PUBLICATIONS

JP-02139114-A English Translation; May 1990 Sakamoto.*
International Search Report and Written Opinion for Application No. PCT/US2020/065493 dated Apr. 16, 2021 (11 pages).

*Primary Examiner* — Laura M Lee
(74) *Attorney, Agent, or Firm* — Michael Best & Friedrich LLP (57) ABSTRACT

A reciprocating saw includes a housing, a motor positioned within the housing, and a shoe coupled to the housing. The shoe is configured to engage a workpiece. The reciprocating saw also includes a proximity sensor configured to detect the workpiece when engaged with the shoe. In response to the proximity sensor detecting formation of a gap between the shoe and the workpiece, the proximity sensor is operable to deactivate the motor.

9 Claims, 5 Drawing Sheets

(56) References Cited

U.S. PATENT DOCUMENTS

| | | | |
|---|---|---|---|
| 8,960,323 B2 * | 2/2015 | Oberheim | B23D 51/02 173/171 |
| 2004/0181951 A1 | 9/2004 | Wittke | |
| 2006/0247795 A1 * | 11/2006 | Gass | B23D 59/001 700/1 |
| 2009/0183887 A1 | 7/2009 | Baber et al. | |
| 2010/0152882 A1 * | 6/2010 | Krapf | B23Q 11/0082 700/177 |
| 2011/0061245 A1 * | 3/2011 | Oberheim | B23D 51/02 30/377 |
| 2014/0053419 A1 * | 2/2014 | Leh | B23D 51/16 30/392 |
| 2016/0288193 A1 * | 10/2016 | Thorson | F16H 25/20 |
| 2017/0216986 A1 * | 8/2017 | Dey, IV | B23D 51/16 |
| 2018/0123500 A1 * | 5/2018 | Heston | H02K 7/145 |
| 2019/0063679 A1 * | 2/2019 | Mergener | F16P 3/142 |
| 2019/0091824 A1 * | 3/2019 | Chellew | B25F 5/02 |
| 2021/0323189 A1 * | 10/2021 | Wiker | B27G 19/02 |

FOREIGN PATENT DOCUMENTS

| | | | | |
|---|---|---|---|---|
| JP | 02139114 A | * | 5/1990 | ........... B23D 59/001 |
| WO | 2013046522 A1 | | 4/2013 | |

* cited by examiner

RECIPROCATING SAW

CROSS-REFERENCE TO RELATED APPLICATIONS

This application claims priority to U.S. Provisional Patent Application No. 62/951,193 filed on Dec. 20, 2019, the entire content of which is incorporated herein by reference.

FIELD OF THE INVENTION

The present invention relates to power tools, and more particularly to a reciprocating saws.

BACKGROUND OF THE INVENTION

Some power tools are capable of automatically deactivating in the event of an emergency, such as the user losing control of the power tool while in use. Such power tools typically base the decision whether to deactivate on load detection or changes in electrical current drawn by an electric motor.

SUMMARY OF THE INVENTION

The invention provides, in one aspect, a reciprocating saw including a housing, a motor positioned within the housing, a shoe coupled to the housing, wherein the shoe is configured to engage a workpiece, and a proximity sensor configured to detect the workpiece when engaged with the shoe. In response to the proximity sensor detecting formation of a gap between the shoe and the workpiece, the proximity sensor is operable to deactivate the motor.

The invention provides, in another aspect, a reciprocating saw including a housing, a motor positioned within the housing, a shoe movable between a retracted position, in which the shoe is configured to engage a workpiece, and an extended position in which a gap is defined between the shoe and the workpiece, and a workpiece detection system configured to detect movement of the shoe from the retracted position to the extended position. In response to the shoe moving from the retracted position to the extended position, the workpiece detection system is operable to deactivate the motor.

The invention provides, in another aspect, a reciprocating saw including a housing, a motor positioned within the housing, a trigger configured to selectively activate the motor, a shoe coupled to the housing and including a workpiece contact surface at a distal end thereof configured to engage a workpiece during a workpiece cutting operation, and a workpiece detection system configured to detect rearward movement of the housing away from the workpiece, a controller in communication with the workpiece detection system, the motor, and the trigger, wherein, in response to the workpiece detection system detecting the rearward movement of the housing exceeding a predetermined value while the trigger is depressed, the controller is operable to deactivate the motor. Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
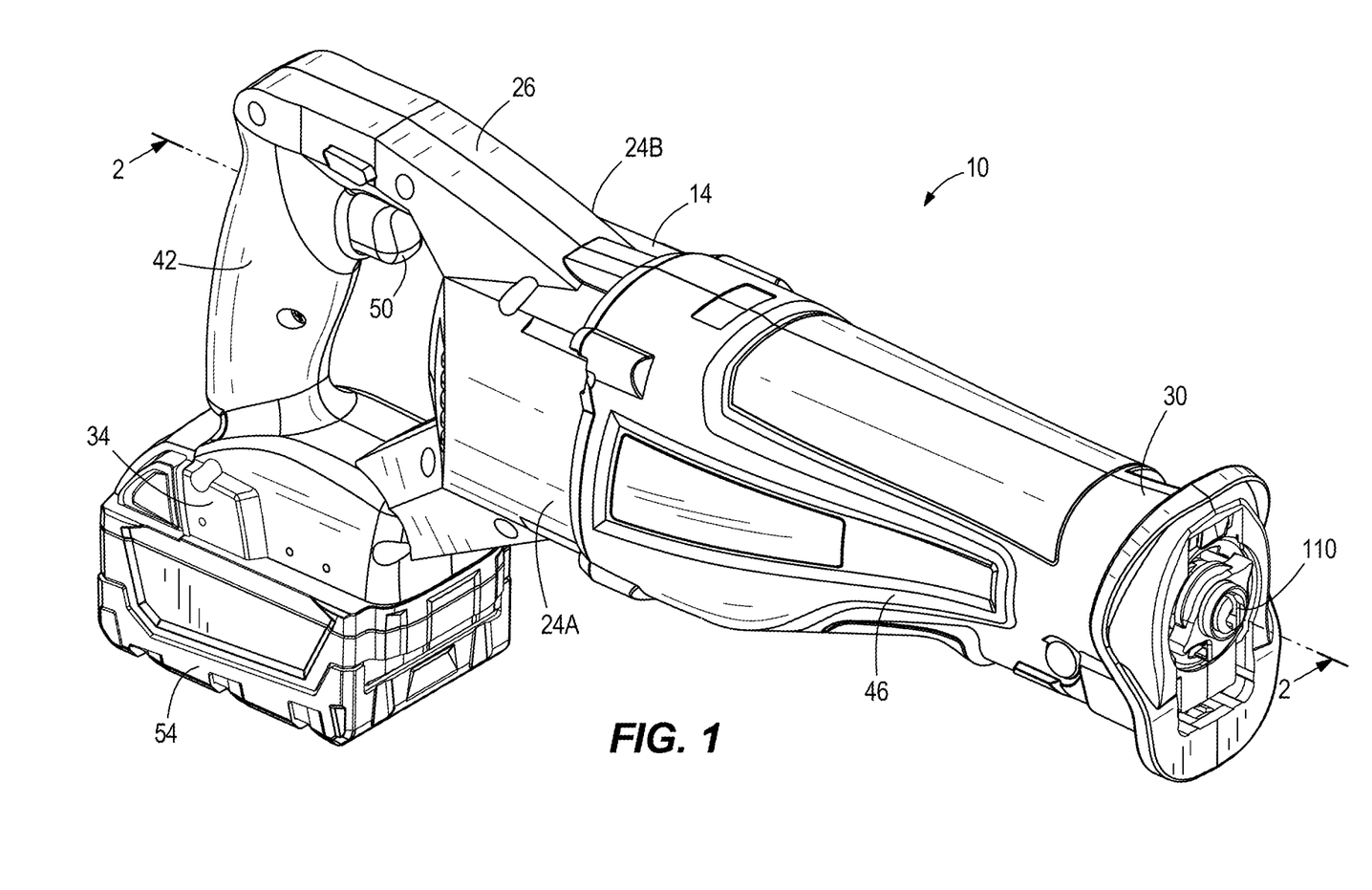
FIG. 1 is a perspective view of a reciprocating saw in accordance with an embodiment of the invention.
Figure 2:
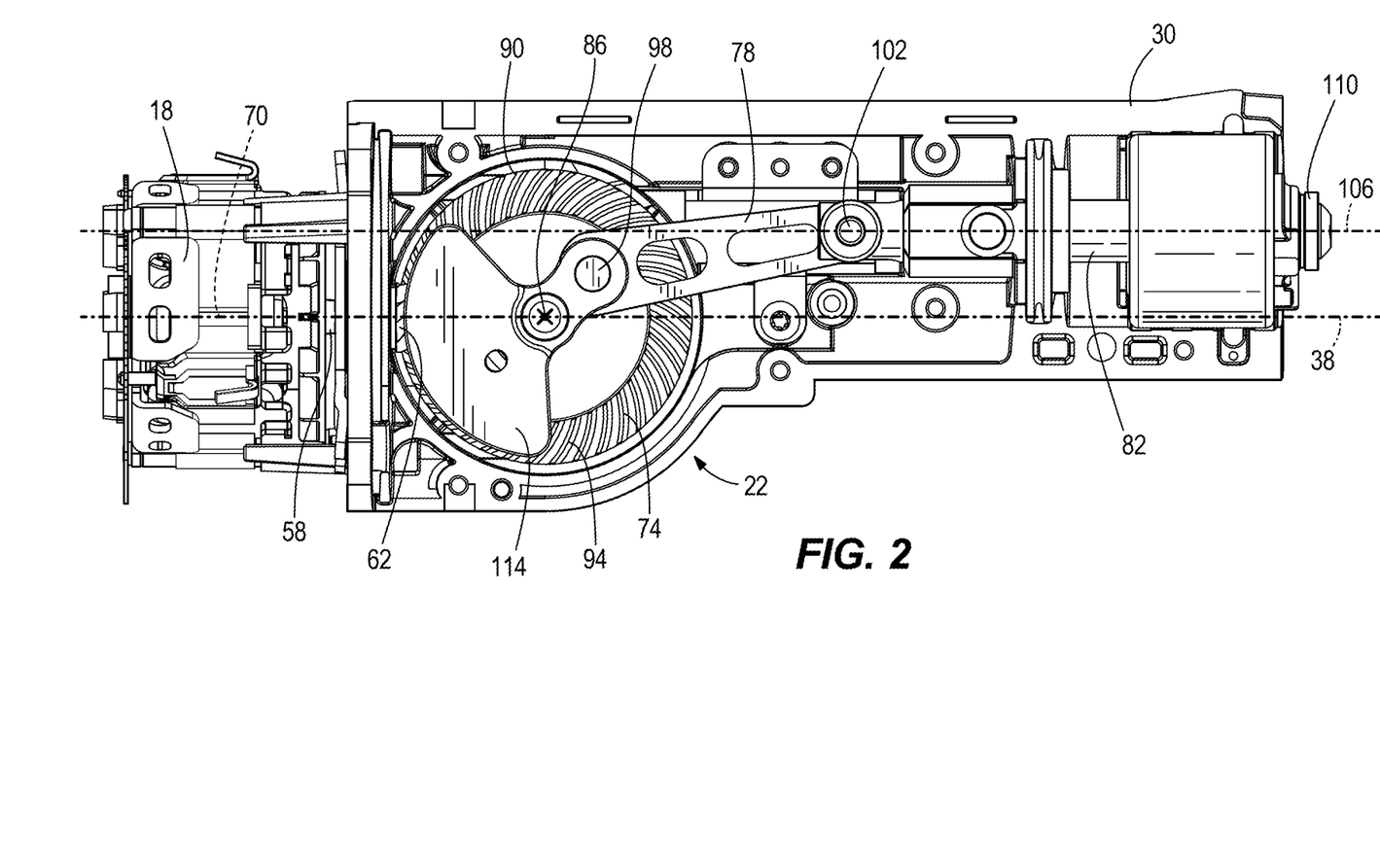
FIG. 2 is a side view of the reciprocating saw of FIG. 1 with a portion of the housing removed.
Figure 3:
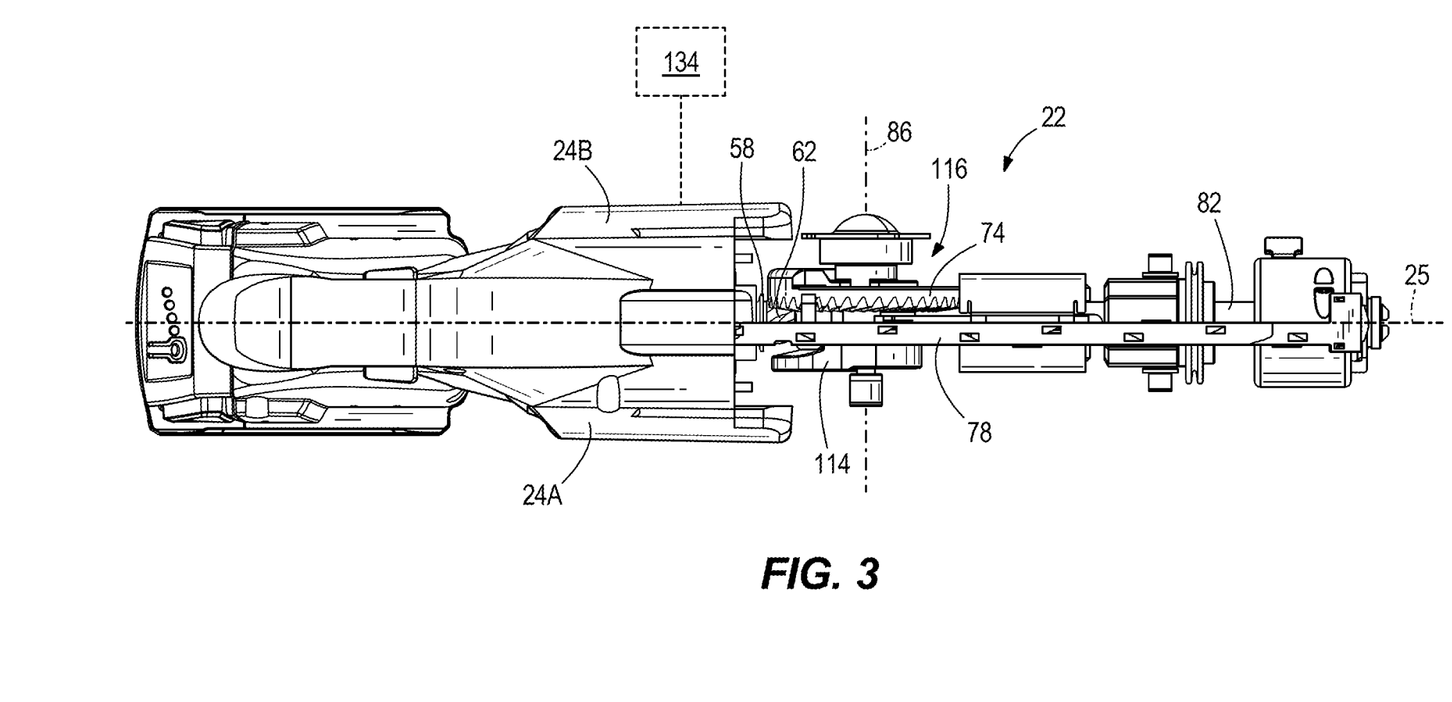
FIG. 3 is a top view of the reciprocating saw of FIG. 1 with a portion of the housing removed.

FIGS. 1-3 illustrate a reciprocating saw 10 including a housing 14, a motor 18 positioned within the housing 14, and a drive mechanism 22 coupled to the motor 18 and positioned within the housing 14. As shown in FIG. 1, the housing 14 is comprised of two clamshell halves 24A, 24B that are connected together along a plane 25 (FIG. 3). In the illustrated embodiment, the clamshell halves 24A, 24B are secured together with threaded fasteners (e.g., screws), but may alternatively be secured together using other suitable coupling means. FIG. 2 illustrates the reciprocating saw 10 with one of the clamshell halves 24A removed to illustrate the internal components (e.g., the motor 18, the drive mechanism 22, etc.) of the saw 10.

Referring back to FIG. 1, the housing 14 includes a rearward portion 26, a forward portion 30, and a battery support portion 34. The housing 14 also defines a longitudinal axis 38 (FIG. 2) that extends through the rearward and forward portions 26, 30. The forward portion 30 includes a work light 32 (FIGS. 4-5) operable to illuminate a workpiece during a cutting operation. The rearward portion 26 includes a D-shaped handle 42, and the forward portion 30 includes a grip 46. The D-shaped handle 42 and the grip 46 are configured to be grasped by a user during operation of the reciprocating saw 10. An actuator or trigger 50 is supported by the rearward portion 26 adjacent the D-shaped handle 42. The trigger 50 is actuatable by a user to selectively power the motor 18. In the illustrated embodiment, the trigger 50 is positioned above the longitudinal axis 38, and the longitudinal axis 38 generally divides the housing 14 into an upper section and a lower section. A shoe 52 (FIGS. 4-5) extends from and is coupled to the forward portion 30 of the housing 14. The position of the shoe 52 relative to the housing 14 may be adjustable to change the protruding length of a saw blade 112 from a contact surface 124 of the shoe 52 depending upon the thickness of the workpiece being cut.

The battery support portion 34 is formed on the rearward portion 26 of the housing 14 below the D-shaped handle 42. In the illustrated embodiment, the battery support portion 34 is located beneath the longitudinal axis 38 of the housing 14 when the reciprocating saw 10 is viewed as shown in FIG. 2. In other embodiments, the battery support portion 34 may be located elsewhere on the housing 14. The battery support portion 34 is configured to receive a battery pack 54 (e.g., an 18 volt Li-ion power tool battery pack) (FIG. 1) and electrically connect the battery pack 54 to the motor 18. In other embodiments, the battery pack 54 may have different voltages and/or chemistries. In still other embodiments, the reciprocating saw 10 may include a power cord such that the motor 18 is powered by an AC power source (e.g., a wall outlet, a portable generator, etc.).

As shown in FIG. 2, the motor 18 is positioned within the housing 14 between the rearward portion 26 and the forward portion 30. The motor 18 is also electrically connected to the battery pack 54 (or other suitable power source) through the trigger 50, and includes a motor shaft 58 and an output gear or pinion 62. The motor shaft 58 defines a central longitudinal axis 70, or motor axis, of the motor 18. In the illustrated embodiment, the central longitudinal axis 70 of the motor 18 is generally aligned or coaxial with the longitudinal axis 38 of the housing 14. When powered, the motor 18 rotates the motor shaft 58 and the pinion 62 about the axis 70 to drive the drive mechanism 22.

As shown in FIGS. 2 and 3, the drive mechanism 22 is positioned at least partially within the forward portion 30 of the housing 14 between the motor 18 and the shoe 52. The illustrated drive mechanism 22 is a slider-crank mechanism that includes a driven gear 74, a connecting rod 78, and an output shaft 82. The driven gear 74 engages the pinion 62 of the motor 18 and defines a central axis 86 about which the gear 74 rotates. In the illustrated embodiment, the central axis 86 is perpendicular to the longitudinal axis 38 of the housing 14, and extends between opposing sides of the housing 14. More particularly, the central axis 86 is perpendicular to the plane 25 (FIG. 3) along which the clamshell halves 24A, 24B of the housing 14 are connected. The driven gear 74 is thereby vertically-oriented within the housing 14.

The longitudinal axis 38 of the housing 14 and the central axis 70 of the motor 18 extend through a center of the gear 74 (i.e., through the central axis 86) to divide the gear 74 into a first, or upper, portion 90 and a second, or lower, portion 94. In the illustrated embodiment, the upper portion 90 of the driven gear 74 is located on the same side of the longitudinal axis 38 as the output shaft 82 and the trigger 50, while the lower portion 94 of the driven gear 74 is located on the same side of the longitudinal axis 38 as the battery support portion 34. In other embodiments, the output shaft 82 may be located on the opposite side of the longitudinal axis 38 such that the lower portion 94 of the driven gear 74 is located on the same side of the longitudinal axis 38 as the output shaft 38. It should be understood that what constitutes the upper and lower portions 90, 94 of the driven gear 74 changes during operation of the drive mechanism 22 because the gear 74 rotates. The terms "upper" and "lower" are simply illustrative terms used to help describe volumes of spaces above and below the axes 38, 70 that are occupied by sections of the gear 74 at any given time. At a particular instance in time, the actual section of the gear 74 that qualifies as the "upper portion" or the "lower portion" is different than at another instance in time.

The connecting rod 78, or drive arm, includes a first end that is coupled to the driven gear 74 by a crank pin 98 and a second end that is coupled to the output shaft 82 by a pivot pin 102. The crank pin 98 is offset from the central axis 86 of the driven gear 74 such that, as the gear 74 is rotated, the crank pin 98 moves about the central axis 86. As the first end of the connecting rod 78 moves with the driven gear 74, the second end of the connecting rod 78 pushes and pulls the output shaft 82 in a reciprocating motion. The crank pin 98 allows the connecting rod 78 to pivot vertically relative to the driven gear 74, while the pivot pin 102 allows the connecting rod 78 to pivot vertically relative to the output shaft 82.

The output shaft 82, or spindle, reciprocates within the forward portion 30 of the housing 14 generally along a spindle axis 106. In the illustrated embodiment, the spindle axis 106 is generally parallel to and positioned above the longitudinal axis 38 of the housing 14. Rotary motion of the motor 18 is thereby translated into linear reciprocating motion of the output shaft 82 by the driven gear 74 and the connecting rod 78.

The motor axis 70 and the spindle axis 106 together define a plane. The driven gear 74 is vertically-oriented within the housing 14 in that the gear 74 rotates about an axis (i.e., the central axis 86) that is perpendicular to the plane defined by the motor and spindle axes 70, 106. In the illustrated embodiment, the plane defined by the motor and spindle axes 70, 106 is the same as the plane 25 (FIG. 3) along which the clamshell halves 24A, 24B are coupled together. In other embodiments, one or both of the motor and spindle axes 70, 106 may be parallel with the plane 25.

With continued reference to FIG. 2, a blade clamp 110 is coupled to an end of the output shaft 82 opposite from the connecting rod 78. The blade clamp 110 receives and secures the saw blade 112 (FIGS. 4-5), or other tool element, to the output shaft 82 for reciprocating movement with the output shaft 82. The output shaft 82 supports the saw blade 112 such that, during operation of the reciprocating saw 10, the drive mechanism 22 moves the saw blade 112 through a cutting stroke when the output shaft 82 is pulled by the connecting rod 78 from an extended position to a retracted position, and through a return stoke when the output shaft 82 is pushed by the connecting rod 78 from the retracted position to the extended position.

With reference to FIG. 3, the illustrated drive mechanism 22 also includes a first counterweight 114 and a second counterweight 116. The first and second counterweights 114, 116 help balance forces generated by the output shaft 82 and the attached saw blade 112 during reciprocating movement. In the illustrated embodiment, the first counterweight 114 and the second counterweight 116 are separate elements, but may alternatively be integrally formed as a single piece. More specifically, the second counterweight 116 and the driven gear 74 are integrally formed as a single piece, and the first and second counterweights 114, 116 are spaced apart from each other along the axis 86. In alternative embodiments, the second counterweight 116 and the driven gear 74 may be separate components.

Figure 4:
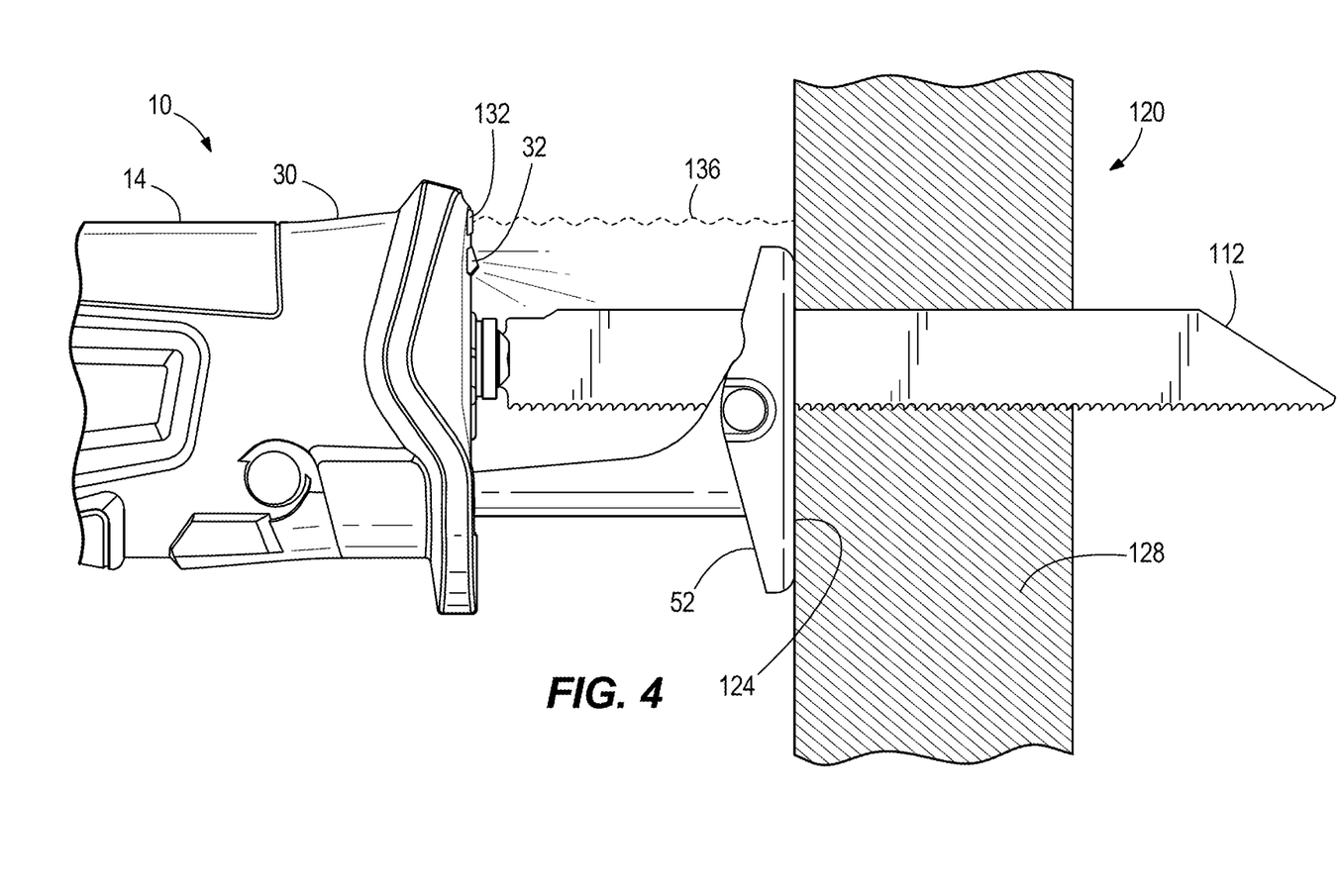
FIG. 4 is a side view of the reciprocating saw of FIG. 1 during a workpiece-cutting operation, illustrating a workpiece detection system.

With reference to FIG. 4, the reciprocating saw 10 includes a workpiece detection system 120 for automatically deactivating the motor 18, without requiring the user to release the motor activation trigger 50, in response to the absence of physical contact (i.e., formation of a gap) between the contact surface 124 of the shoe 52 and a workpiece 128. In some embodiments, the system 120 includes a proximity sensor 132 positioned on the forward portion 30 of the housing 14, above the saw blade 112 and adjacent the work light 32. The proximity sensor 132 may be configured, for example, as an ultrasonic sensor, a laser sensor, an infrared sensor, etc. The proximity sensor 132 is in electrical communication with the motor 18 and outputs an associated control signal (e.g., via a controller 134) (FIG. 3) to the motor 18. The proximity sensor 132 is operable to emit a pulse 136 with a specific frequency to detect the location of the workpiece 128 relative to the sensor 132, and thus the location of the contact surface 124 on the shoe 52 relative to the workpiece 128, to determine whether a gap exists between the contact surface 124 and the workpiece 128 that might suggest that the user has lost control of the saw 10. In this embodiment of the system 120, although the position of the contact surface 124 may be adjustable relative to the housing 14 prior to a workpiece cutting operation, the position of the shoe 52, and thus the contact surface 124, remains fixed relative to the housing 14 during a workpiece cutting operation.

During a cutting operation with the reciprocating saw 10, the user pulls the trigger 50 to activate the motor 18 and plunges the blade 112 into the workpiece 128 until the contact surface 124 on the shoe 52 abuts against the workpiece 128. Thereafter, the proximity sensor 132 continuously measures the distance between the sensor 132 and the workpiece 128. Provided the measured distance is within a predetermined acceptable range, the motor 18 remains activated. However, in the event that the user unintentionally loses control of the saw 10 and the contact surface 124 of the shoe 52 loses contact with the workpiece 128, thereby forming a gap between the contact surface 124 and the workpiece 128 (while the user maintains the trigger 50 in a depressed state), the measured distance between the sensor 132 and the workpiece 128 will fall outside the predetermined acceptable range (as a result of rearward movement of the housing 14 relative to the workpiece 128). More particularly, the pulse 136 emitted by the sensor 132 detects that the shoe 52 has disengaged the workpiece 128 and that the proximity of the workpiece 128 relative to the sensor 132 has increased. In response, the controller 134, using the input provided by the proximity sensor 132, determines that the measured distance between the sensor 132 and the workpiece 128 exceeds the predetermined range and then deactivates the motor 18 despite the trigger 50 being held in a depressed state by the user. Once the user has regained control of the saw 10, the user may release and again depress the trigger 50, which will re-activate the motor 14 to continue the cutting operation.

Figure 5:
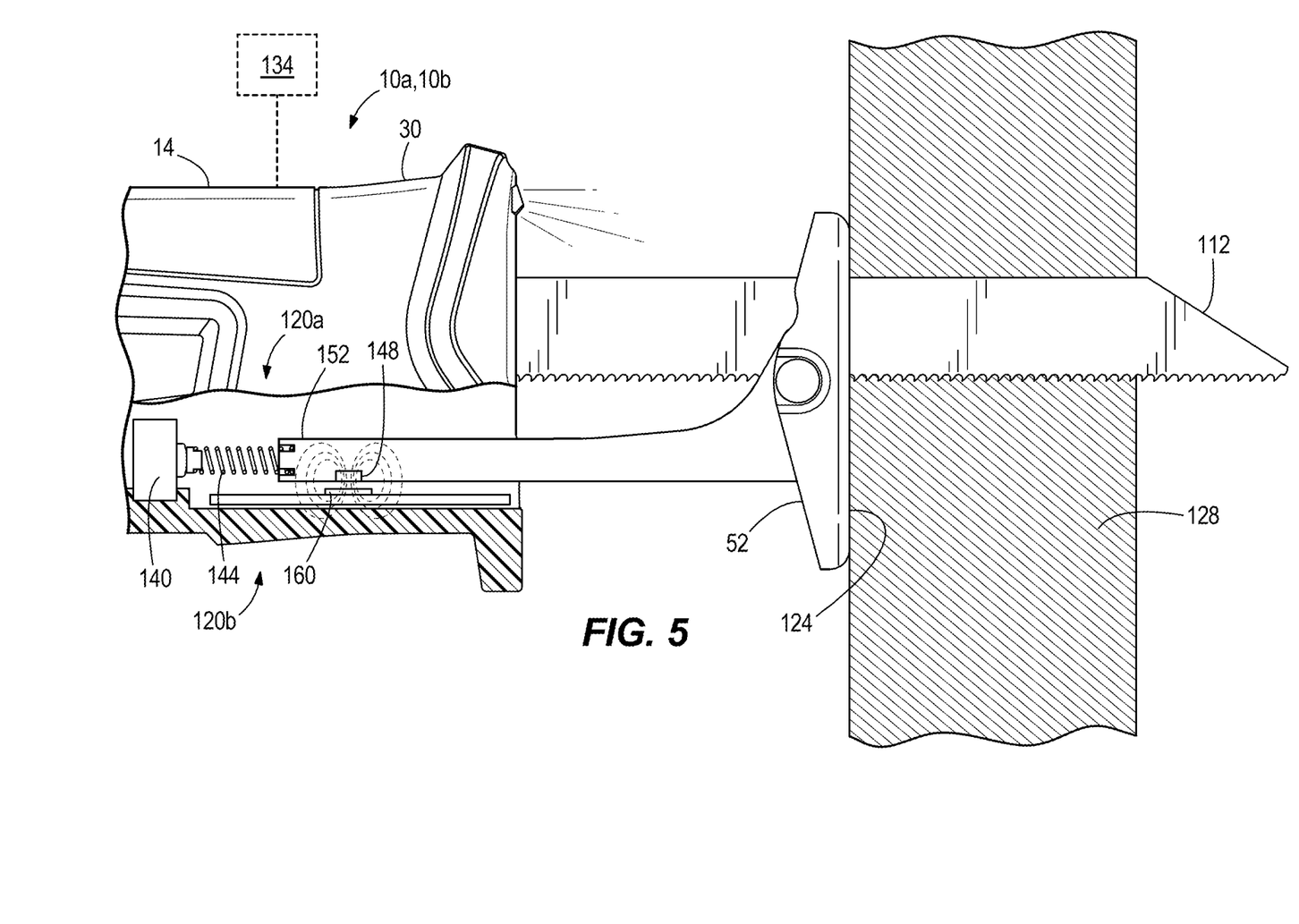
FIG. 5 is a side view of a reciprocating saw in accordance with another embodiment of the invention during a workpiece-cutting operation, illustrating two additional workpiece detection systems.

With reference to FIG. 5, another embodiment of a reciprocating saw 10a is shown including another workpiece detection system 120a. Like features as the reciprocating saw 10 and workpiece detection system 120 described above and shown in FIG. 4 are shown with like reference numerals. The workpiece detection system 120a includes a switch 140 (e.g., a microswitch) in electrical communication with the motor 18 (via the controller 134). The shoe 52 is movable between a fully extended position, where the shoe 52 is disengaged from the workpiece 128, and a retracted position, where the shoe 52 is engaged with the workpiece 128 without a gap between the contact surface 124 and the workpiece 128. The saw 10a includes a compression spring 144 positioned between a rear end 152 of the shoe 52 and the switch 140 for biasing the shoe 52 toward the extended position.

In operation of the reciprocating saw 10a with the workpiece detection system 120a, the user pulls the trigger 50 to activate the motor 18 and plunges the blade 112 into the workpiece 128 until the contact surface 124 on the shoe 52 abuts against the workpiece 128 and the shoe 52 is displaced rearward from the extended position to the retracted position. As the rear end 152 of the shoe 52 gets closer to the switch 140, the preload force applied to the spring 144 increases. After the preload force on the spring 144 exceeds a predetermined threshold, the force input actuates the switch 140 into a first state, signaling to the controller 134 that the cutting operation has begun. Provided the switch 140 remains in the first state (coinciding with the shoe 52 remaining in the retracted position), the motor 18 remains activated. However, in the event that the user unintentionally loses control of the saw 10a and the contact surface 124 of the shoe 52 loses contact with the workpiece 128 (after first returning to the extended position as a result of rearward movement of the housing 14 from the workpiece 128), thereby forming a gap between the contact surface 124 and the workpiece 128 (while the user maintains the trigger 50 in a depressed state), the force input on the switch 140 is removed, changing the switch 140 from the first state to a different, second state. In response, the controller 134, using the input provided by the switch 140 in the second state, determines that a gap has formed between the contact surface 124 of the shoe and the workpiece 128, and then deactivates the motor 18 despite the trigger 50 being held in a depressed state by the user. Once the user has regained control of the saw 10a, the user may release and again depress the trigger 50, which will re-activate the motor 14 to continue the cutting operation.

With continued reference to FIG. 5, yet another embodiment of a reciprocating saw 10b is shown including another workpiece detection system 120b. Like features as the reciprocating saw 10, 10a and workpiece detection system 120, 120a described above and shown in FIGS. 4 and 5 are shown with like reference numerals. Instead of the switch 140, the workpiece detection system 120b includes a Hall-effect sensor 160 in electrical communication with the motor 18 (via the controller 134) and a magnet 148 coupled to the rear end 152 of the shoe 52 for movement therewith between the extended and retracted positions.

In operation of the reciprocating saw 10b with the workpiece detection system 120b, the user pulls the trigger 50 to activate the motor 18 and plunges the blade 112 into the workpiece 128 until the contact surface 124 on the shoe 52 abuts against the workpiece 128 and the shoe 52 is displaced rearward from the extended position to the retracted position. Once the shoe 52 reaches the retracted position, the Hall-effect sensor 160 detects the magnet 148 and outputs a signal to the controller 134 that the cutting operation has begun. Provided the Hall-effect sensor 160 continues to detect the magnet 148 (coinciding with the shoe 52 remaining in the retracted position), the motor 18 remains activated. However, in the event that the user unintentionally loses control of the saw 10b and the contact surface 124 of the shoe 52 loses contact with the workpiece 128 (after first returning to the extended position as a result of rearward movement of the housing 14 from the workpiece 128), thereby forming a gap between the contact surface 124 and the workpiece 128 (while the user maintains the trigger 50 in a depressed state), the Hall-effect sensor 160 no longer detects the magnet 148 and outputs a signal to the controller 134 to deactivate the motor 18 despite the trigger 50 being held in a depressed state by the user. Once the user has regained control of the saw 10b, the user may release and again depress the trigger 50, which will re-activate the motor 14 to continue the cutting operation.

Instead of being used with reciprocating saws 10, the workpiece detection systems 120, 120a, 120b may be alternatively used in other types of power tools including, for example: jigsaws, band saws, routers, and circular saws.

Various features of the invention are set forth in the following claims.

What is claimed is:

1. A reciprocating saw comprising:
   a housing;
   a motor positioned within the housing and configured to drive a reciprocating saw blade;

a shoe movable relative to the housing between a retracted position, in which the shoe is configured to engage a workpiece, and an extended position in which a gap is defined between the shoe and the workpiece; and a workpiece detection system configured to detect movement of the shoe from the retracted position to the extended position;

wherein, in response to the shoe moving from the retracted position to the extended position, the workpiece detection system is operable to deactivate the motor.

2. The reciprocating saw of claim 1, further comprising a spring biasing the shoe toward the extended position.

3. The reciprocating saw of claim 2, wherein the workpiece detection system includes a switch operable to deactivate the motor in response to being actuated by movement of the shoe from the retracted position to the extended position.

4. The reciprocating saw of claim 3, wherein a force input is removed from the switch in response to movement of the shoe from the retracted position to the extended position.

5. The reciprocating saw of claim 4, further comprising a controller in communication with the switch, wherein, in response to the force input being removed from the switch, the controller determines a gap has formed between the shoe and the workpiece.

6. The reciprocating saw of claim 1, wherein the workpiece detection system includes
 a magnet coupled for movement with the shoe between the retracted position and the extended position, and
 a Hall-effect sensor coupled to the housing and configured to detect the magnet.

7. The reciprocating saw of claim 6, wherein, in response to the Hall-effect sensor detecting the magnet in the extended position, the Hall-effect sensor is operable to deactivate the motor.

8. The reciprocating saw of claim 1, further comprising a trigger configured to activate and deactivate the motor.

9. The reciprocating saw of claim 8, wherein the workpiece detection system is operable to deactivate the motor, while the trigger is actuated, if the shoe is detected in the extended position.

* * * * *